Oct. 13, 1931.  G. R. SYLVESTER  1,826,840
APPARATUS FOR COLLECTING AND CONVEYING MATERIALS
Filed Oct. 2, 1928  2 Sheets-Sheet 1
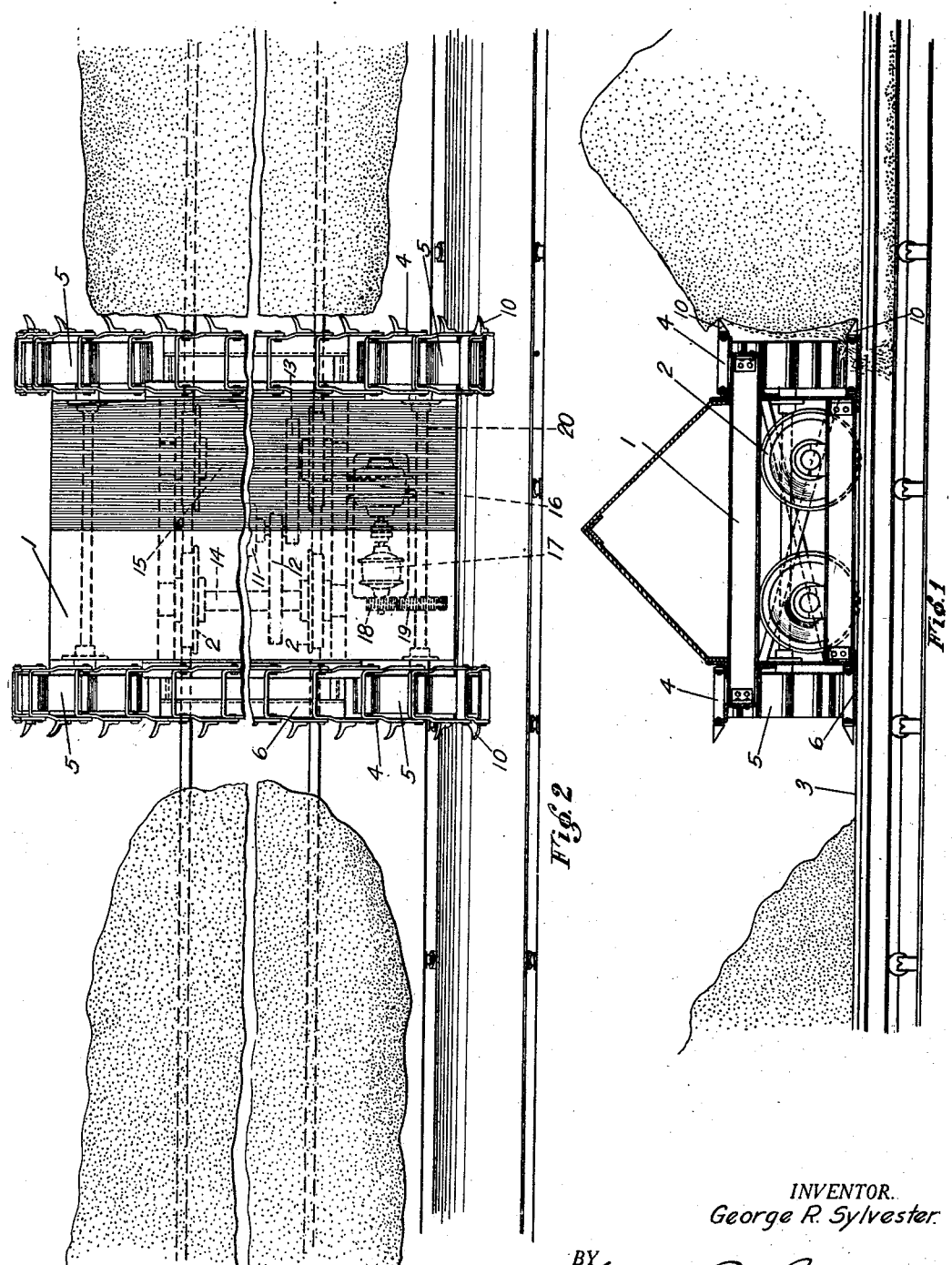
INVENTOR.
George R. Sylvester
BY
ATTORNEY.

Oct. 13, 1931. G. R. SYLVESTER 1,826,840
APPARATUS FOR COLLECTING AND CONVEYING MATERIALS
Filed Oct. 2, 1928 2 Sheets-Sheet 2
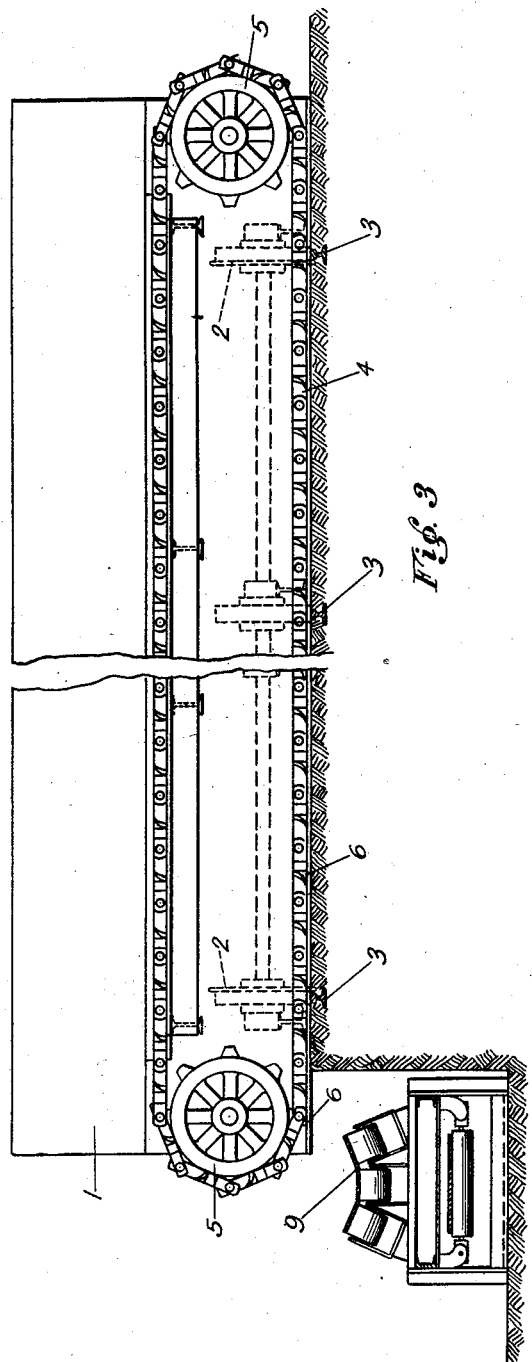
INVENTOR.
George R. Sylvester.
BY
ATTORNEY.

Patented Oct. 13, 1931

1,826,840

UNITED STATES PATENT OFFICE

GEORGE R. SYLVESTER, OF COLUMBUS, OHIO, ASSIGNOR TO THE HARROP CERAMIC SERVICE COMPANY, OF COLUMBUS, OHIO, A CORPORATION OF OHIO

APPARATUS FOR COLLECTING AND CONVEYING MATERIALS

Application filed October 2, 1928. Serial No. 309,775.

My invention relates to apparatus for collecting and conveying materials. It has particular reference to a method and apparatus for collecting or reclaiming loosely piled materials, such as clay, gravel, sand, coal, coke or in fact, any material or materials which are carried in piles for industrial or other purposes.

Heretofore, where the collecting and reclaiming of material has been a necessary procedure, this has, in most instances, been accomplished by the use of overhead means such as grab buckets or similar equipment or underground conveying means into which the materials have been fed by hand or have been allowed to flow by gravity.

One object of my invention is to provide a simple and positively acting device for collec.ing or reclaiming materials of the type described whereby the use of overhead or underground equipment and the expense and inconvenience incident to the use thereof may be entirely eliminated.

In accomplishing this object of my invention, I provide a collecting or reclaiming and conveying device which is adapted to rest and travel approximately upon normal ground surface level. My device is preferably so constructed that it has a reciprocable path of travel and has embodied therein means whereby materials may be collected or reclaimed while the device is moving in either direction of reciprocation. I have also provided a conveying means, operating in conjunction with the collecting or reclaiming part of my device whereby the reclaimed materials may be taken directly from such part and conveyed to any predetermined point for treatment or use.

Other objects of my invention will appear in the following detailed description and the preferred embodiment of my invention may be seen in the accompanying drawings wherein similar characters of reference designate corresponding parts and wherein:

Figure 1 is a cross section of the preferred embodiment of my invention, showing my device operating between two piles of material to be reclaimed.

Figure 2 is a plan view of the structure shown in Figure 1.

Figure 3 is a side elevation of my device and illustrating its relation to the lateral conveyer which I use and the manner of delivering thereto.

Referring to the drawings, I have shown a frame 1 mounted upon suitable wheels 2 which are preferably of the type adapted to travel on rails 3. As shown in Figures 1 and 3, three of these wheels are provided across the width of the frame and three rails are provided on which these wheels are adapted to travel. It will be understood, however, that any number of wheels and any number of rails may be used, or that other means of transporting or moving the device may be utilized.

Adapted to travel across the width of the frame 1 are spaced drag chains 4 which are preferably of the endless type. These chains travel on sprockets 5 which are mounted on the frame 1. A suitable motor or drive element may be mounted on the frame, which will have a driving connection with the sprockets 5.

The lower part of the frame 1 preferably comprises a flat plate 6 having a smooth solid upper surface over which a portion of each chain is adapted to slide during the travel of the chain around the sprocket. This plate is preferably so located that it rides upon the rails on which my apparatus is adapted to travel or, at least, it rides immediately above the rails. The tooth-shaped attachments 10 carried by the chain project in advance of each plate 6 and dig into the pile of material being operated upon at the base thereof and undercut it at two levels so that the material will fall onto the plate 6 and be transported by the conveyor chain to the end of the apparatus for delivery to a conveyor described.

As shown in Figure 3, these plates 6 and the conveying structure extend over into superposed relation to a conveyer 9 which is preferably placed parallel to the track on which the frame 1 travels. This conveyer may be of any suitable type and may be actuated by any preferred means.

It will be understood that my collecting or reclaiming device may be propelled along the rails by any well-known means. For instance in Figure 2, I have shown a motor 11 driving chains 12 and 13 which in turn drive the axles 14 and 15 which carry the transporting wheels of my apparatus. Likewise, I have shown a means for driving the conveyer chain which include a motor 16, a clutch 17, and gears 18 and 19 which transmit the drive to a shaft 20.

In the operation of my device, assuming that the material to be collected or reclaimed is disposed in two spaced piles across the track and with my collecting or reclaiming device located in between, movement of my device in one direction may be effected either manually or mechanically. As this movement progresses, the projecting teeth 10 of the conveyer chain which is being driven will undercut the pile of material at its bottom and cause some of the material to fall over onto the plate 6. When the material arrives upon the plate 6, it will then be subjected to the moving drag chain or conveyer 4 which will carry it along the plate 6. When it reaches the delivery end of the plate 6, this material will fall onto the conveyer 9 in a manner that will be well understood by inspection of Figure 3. This conveyer 9 will then carry the material to any desired point.

This operation may continue as long as there is any material in the path of movement of my collecting and reclaiming device. At this time, or in fact at any time, the direction of movement of this reclaiming device may be reversed and the device may then be made effective to collect or reclaim material from the pile on the opposite side of the device. The conveyer chains on both sides of my device preferably move in the same direction and deliver to the same side thereof. Therefore, it will readily be seen that it is necessary to provide only one lateral conveyer, as at 9, inasmuch as the material will be delivered to the same side regardless of the direction of movement of the collecting or reclaiming device as a whole.

In the operation of my device, assuming that the material to be collected or reclaimed is disposed in two spaced piles across the track and with my collecting or reclaiming device located in between, movement of my device in one direction may be effected either manually or mechanically. As this movement progresses, the advancing plate 6, not indicated on drawings, will slide beneath the bottom of one pile. If the side of the pile is overhanging, the tooth-shaped attachments 10 will dig into the overhanging portion of the pile and, owing to their lateral movement with the conveyer chain will dislodge a portion of the material, whereupon it will drop downwardly upon the plate 6.

When the material arrives upon the plate 6, it will then be subjected to the moving drag chain or conveyer 4, which will carry it along the plate 6. When it reaches the delivery end of the plate 6, this material will fall onto the conveyer 9. This lateral conveyer will then carry the material to any desired point.

It will be apparent that I have provided a simple method and a simple and effective apparatus for collecting or reclaiming material of the type indicated. My apparatus may be continuously or intermittently advanced into the pile of material or it may be advanced first in one direction and then in the other. It is particularly advantageous that my device is capable of collecting while moving in either direction, inasmuch as it is frequently desirable to build up another pile of material while the first pile of material is being collected or reclaimed.

It will be apparent that my device is of rigid construction. Likewise, it operates practically at the normal ground surface level and therefore is effective to remove substantially all of the material in the pile being operated upon, although it is not necessarily limited to such an operation. Furthermore, my device has only two general horizontal movements but, nevertheless, may have a practically continuous operation.

Having thus described my invention, what I claim is:

1. Apparatus for collecting material comprising a carriage, separate material collecting conveyers on opposing sides thereof, one of said conveyers being adjacent and one remote from the material when the apparatus is in operation, said carriage being movable to bring either conveyer into contact with material to be collected and said conveyers being movable in the same direction.

2. Apparatus for collecting material comprising a carriage, material collecting conveyers on opposing sides thereof, one of said conveyers being adjacent and one remote from the material being collected when the apparatus is in operation, tooth members on said conveyers, means for driving said conveyers, means for moving said carriage, and conveying means to which said conveyers deliver the material collected.

3. Apparatus for collecting material comprising a carriage, a conveyer on either side thereof, said carriage having a plate projecting from the side and adjacent the bottom thereof, a portion of each of said conveyers traveling along the top of said plate and another portion thereof superposed thereabove.

4. Apparatus for collecting material comprising a carriage, a conveyer on either side thereof, said carriage having a plate projecting from the side and adjacent the bottom thereof, a portion of each of said conveyers traveling along the top of said plate and another portion thereof superposed thereabove, and tooth members on said conveyers.

5. Apparatus for collecting material comprising a movable body portion, and independent conveying units disposed on opposite sides thereof, said conveying units being bodily immovable with relation to said body portion and of such a structure that material can be collected by the apparatus while moving in either one of two directions by advancing the entire side of a conveying unit against the material to be collected.

6. Apparatus for collecting material comprising a movable body portion, and independent conveying units disposed on different sides of said body portion, said conveying units being bodily immovable with relation to said body portion and of such a structure that material can be collected by the apparatus while moving in either one of two directions by advancing the entire side of a conveying unit against the material to be collected.

7. Apparatus for collecting material comprising a movable body portion, and independent conveying units disposed on different sides of said body portion, said conveying units being bodily immovable with relation to said body portion and of such a structure that material can be collected by the apparatus by moving in either one of two directions by advancing the entire side of a conveying unit against the material to be collected, said conveying units being operative to convey the material collected on either one of two sides of said body portion to one end thereof.

8. Apparatus for collecting material comprising a movable body portion, and independent conveying units disposed on opposite sides thereof, said conveying units being bodily immovable with relation to said body portion and of such a structure that material can be collected by the apparatus while moving in either one of two directions by advancing the entire side of a conveying unit against the material to be collected, said conveying units being operative to convey the material collected on opposite sides thereof to one end thereof.

9. Apparatus for collecting material comprising, in combination with a stationary conveyer, a collecting member movable along and in proximity to said stationary conveyer, and a plurality of collecting and conveying units disposed on different sides of said movable collecting member, said conveying units being bodily immovable with relation to said member and being of such a structure that material can be collected by the apparatus by advancing the entire side of either conveying unit against the material to be collected, all of said collecting and conveying units being designed to deliver material collected to said stationary conveyer.

10. Apparatus for collecting material comprising, in combination with a stationary conveyer, a collecting member movable along and in proximity to said stationary conveyer, and a plurality of collecting and conveying units disposed on opposite sides of said movable collecting member, said conveying units being bodily immovable with relation to said member and being of such a structure that material can be collected by the apparatus by advancing the entire side of either conveying unit against the material to be collected, all of said collecting and conveying units being designed to deliver material collected to said stationary conveyer.

11. Apparatus for collecting material comprising, in combination with a stationary conveyer, a collecting member movable along and in proximity to said stationary conveyer, and a plurality of collecting and conveying units disposed on opposite sides of said collecting member, said conveying units being bodily immovable with relation to said member and being of such a structure that material can be collected by the apparatus by advancing the entire side of either conveying unit against the material to be collected, said collecting and conveying units being designed to deliver material to points directly over said stationary conveyer and to deposit such material thereon.

12. Apparatus for collecting material comprising traction means, a body portion mounted on said traction means, plates extending along opposing sides of said body portion, endless conveying members with their lower side portions mounted to travel along said plates and with their upper sides spaced therefrom, and spur members projecting outwardly from the sides of said conveying members for cutting into the material to be collected.

In testimony whereof I hereby affix my signature.

GEORGE R. SYLVESTER.